United States Patent
Schukar et al.

(10) Patent No.: US 7,794,593 B2
(45) Date of Patent: Sep. 14, 2010

(54) CROSS-FLOW MEMBRANE MODULE

(75) Inventors: Gary W. Schukar, North Oak, MN (US); Dan L. Fanselow, White Bear Lake, MN (US); Todd W. Johnson, Minneapolis, MN (US); Nicholas J. Isder, St. Paul, MN (US); Bradley K. Fong, Woodbury, MN (US); Michael D. Begich, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 379 days.

(21) Appl. No.: 11/290,972

(22) Filed: Nov. 30, 2005

(65) Prior Publication Data

US 2007/0119771 A1    May 31, 2007

(51) Int. Cl.
*B01D 63/00* (2006.01)
*B01D 61/00* (2006.01)

(52) U.S. Cl. .................. 210/321.77; 210/321.75; 210/510.1; 210/644; 210/321.6; 210/321.72

(58) Field of Classification Search .......... None
See application file for complete search history.

(56) References Cited

U.S. PATENT DOCUMENTS

| | | | |
|---|---|---|---|
| 3,801,404 A | 4/1974 | Druin et al. | |
| 3,839,516 A | 10/1974 | Williams et al. | |
| 3,843,761 A | 10/1974 | Bierenbaum et al. | |
| 4,255,376 A | 3/1981 | Soehngen | |
| 4,257,997 A | 3/1981 | Soehngen et al. | |
| 4,276,179 A | 6/1981 | Soehngen | |
| 4,298,693 A | 11/1981 | Wallace | |
| 4,726,989 A | 2/1988 | Mrozinski | |
| 4,973,434 A | 11/1990 | Sirkar et al. | |
| 5,120,594 A | 6/1992 | Mrozinski | |
| 5,238,623 A | 8/1993 | Mrozinski | |

(Continued)

FOREIGN PATENT DOCUMENTS

DE    38 30 157 A1    1/1989

(Continued)

OTHER PUBLICATIONS

Supplementary European Search Report for PCT/US2006/044952 dated Apr. 6, 2010.

*Primary Examiner*—Krishnan S Menon
(74) *Attorney, Agent, or Firm*—Gregory D. Allen

(57) ABSTRACT

Liquid-liquid extraction elements are described. A liquid-liquid extraction element includes a first layer pair and a second layer pair disposed adjacent the first layer pair forming a stack of layers. The first layer pair includes a first polymeric microporous membrane, and a first flow channel layer oriented in a first flow direction having a fluid inlet and a fluid outlet disposed on first opposing sides of the extraction element. The second layer pair includes a second polymeric microporous membrane and a second flow channel layer oriented in a second flow direction different than the first flow direction and having a fluid inlet and a fluid outlet disposed on second opposing sides of the extraction element. The first microporous membrane is disposed between the first flow channel and the second flow channel. Methods of extracting a dissolved solute from a first liquid to a second liquid are also described.

3 Claims, 2 Drawing Sheets

U.S. PATENT DOCUMENTS

| | | | |
|---|---|---|---|
| 5,562,825 A | 10/1996 | Yamada et al. | |
| 6,077,436 A * | 6/2000 | Rajnik et al. | 210/650 |
| 6,514,412 B1 | 2/2003 | Insley et al. | |
| 6,986,428 B2 | 1/2006 | Hester et al. | |
| 6,998,492 B2 | 2/2006 | Seo et al. | |
| 7,105,089 B2 | 9/2006 | Fanselow et al. | |
| 7,122,709 B2 | 10/2006 | Fanselow et al. | |
| 7,316,780 B1 * | 1/2008 | Fendya et al. | 210/510.1 |
| 2004/0178147 A1 | 9/2004 | Fanselow et al. | |
| 2004/0181101 A1 * | 9/2004 | Fanselow et al. | 568/913 |
| 2006/0283800 A1 | 12/2006 | Fanselow et al. | |

FOREIGN PATENT DOCUMENTS

| | | |
|---|---|---|
| GB | 2 407 151 A | 4/2005 |
| WO | WO 2004/082810 A1 | 9/2004 |

* cited by examiner

CROSS-FLOW MEMBRANE MODULE

BACKGROUND

The present disclosure relates to cross-flow membrane modules and systems using the same for extracting a dissolved solute from a first liquid into a second liquid.

Liquid-liquid extraction is a commonly employed technique for transferring a solute dissolved in a first liquid to a second liquid that is essentially immiscible with the first liquid. The solution of the solute in the first liquid is generally termed a "feed solution", and the second liquid is generally termed an "extractant" or "liquid extractant". The solute tends to distribute itself between the two liquids in accordance with the relative solubility of the solute in the two liquids when the feed solution is brought into contact with the liquid extractant.

One conventional approach to achieving liquid-liquid extraction is to directly mix the feed solution and the liquid extractant. Unfortunately, this technique often times gives rise to the formation of a persistent dispersion or emulsion within the mixture, rendering the extraction process highly inefficient, in terms of both time and end result.

A microporous membrane extraction methodology has been developed to address the above-identified dispersion concerns. In particular, one side of a microporous membrane is typically contacted with the feed solution, and the opposing side of the microporous membrane with the liquid extractant. A liquid-liquid interface, across which the solute is transferred, is thus formed between the feed solution and the liquid extractant within micropores of the microporous membrane.

The concept of providing gross separation between the feed solution and the liquid extractant via a microporous membrane has proven to be viable. However, the viability of microporous membrane liquid-liquid extraction in an industrial setting typically depends on the rate of extraction (that in turn is a function of the liquid-liquid interface surface area provided by the microporous membrane) and on the ease of replacing the membrane, should it become damaged or fouled. Conventional microporous membrane liquid-liquid extraction apparatuses and methods utilize designs with limited liquid-liquid interface surface area, and that do not facilitate membrane replacement. These inherent inefficiencies have impeded the large scale, commercial implementation of microporous membrane extraction.

Many commercial applications, such as for example, obtaining ethanol from a fermented feed broth, could benefit from the use of a microporous membrane liquid-liquid extraction technique. As such, a need exists for high productivity liquid-liquid extraction systems incorporating a microporous membrane adapted to be maintained on a cost effective basis.

SUMMARY

The present disclosure provides cross-flow membrane modules and systems using the same for extracting a dissolved solute from a first liquid into a second liquid. In some embodiments, these membrane modules are useful for extracting a dissolved solute, such as ethanol, from a first liquid, such as water, preferentially into a second liquid.

One aspect of the present invention relates to a liquid-liquid extraction element that includes a first layer pair and a second layer pair disposed adjacent the first layer pair forming a stack of layers. The first layer pair includes a first polymeric microporous membrane, and a first flow channel layer oriented in a first flow direction having a fluid inlet and a fluid outlet disposed on first opposing sides of the extraction element. The second layer pair includes a second polymeric microporous membrane and a second flow channel layer oriented in a second flow direction different than the first flow direction and having a fluid inlet and a fluid outlet disposed on second opposing sides of the extraction element. The first microporous membrane is disposed between the first flow channel and the second flow channel.

Another aspect of the present invention relates to a method of extracting a dissolved solute from a first liquid into a second liquid. The method includes providing a liquid-liquid extraction element, flowing a first liquid having a dissolved solute through the first flow channel layer, flowing a second liquid through the second flow channel layer, and transferring the solute from the first liquid into the second liquid across the first and second microporous membranes. The extraction element includes a plurality of first layer pairs and a plurality of second layer pairs, each second layer pair alternating between first layer pairs and forming a stack of layers. The first layer pair includes a first polymeric microporous membrane and a first flow channel layer oriented in a first flow direction having a fluid inlet and a fluid outlet disposed on first opposing sides of the extraction element. The second layer pair includes a second polymeric microporous membrane and a second flow channel layer oriented in a second flow direction different than the first flow direction and having a fluid inlet and a fluid outlet disposed on second opposing sides of the extraction element. The first microporous membrane is disposed between the first flow channel and the second flow channel.

The above summary is not intended to describe each disclosed embodiment or every implementation of the present disclosure. The Figures, Detailed Description and Examples that follow more particularly exemplify these embodiments.

BRIEF DESCRIPTION OF THE DRAWINGS

The disclosure may be more completely understood in consideration of the following detailed description of various embodiments in connection with the accompanying drawings, in which.

Figure 1:
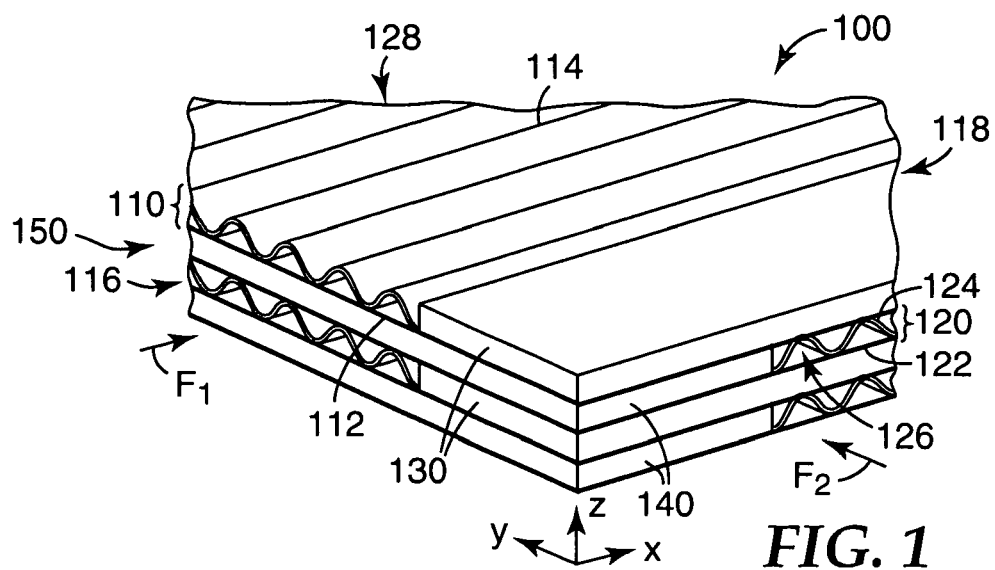
FIG. 1 is a schematic perspective view of an illustrative cross-flow membrane module.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure provides cross-flow membrane modules and systems using the same for extracting a dissolved solute from a first liquid into a second liquid.

For the following defined terms, these definitions shall be applied, unless a different definition is given in the claims or elsewhere in this specification.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a layer" includes of two or more layers. As used in this specification and the appended claims, the term "or" is generally employed in its sense including "and/or" unless the content clearly dictates otherwise.

Unless otherwise indicated, all numbers expressing quantities, measurement of properties and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

In many embodiments, the liquid-liquid extraction modules include sheets of porous membrane that are layered alternatively with sheets of corrugated film to form a stack. The corrugations in the spacer layers can serve as flow channels for the fluids passing on either side of the porous membrane, and are open to the outside of the stack. In some embodiments, each corrugated layer is orientated ninety degrees to the corrugated layer immediately above and below that corrugated layer. Side seals, formed between the porous membrane of one layer, and the corrugated layer below it (in the direction of a corrugated groove and along opposing sides) channel the flow in the groove direction, and prevent flow in the cross-direction. In some embodiments, edge seals between the layers can be beads of adhesive or sonic or heat sealed. Thus, a two-directional liquid-liquid extraction flow module can be created, in which a first fluid flows through the module in a first direction, passing through the corrugated spacers and porous membrane of every other layer, contacting the porous membrane layers uniformly on one side; and a second fluid is directed to flow through the liquid extraction module in a second direction (often orthogonal) to the first direction, passing through the corrugated spacers of layers alternate to the first, contacting the membrane layers uniformly on the other side.

In many embodiments, the liquid extraction module is designed and configured to fit into a square frame and/or housing with manifolds on four side (edge) faces of the liquid extraction module. Fluids entering the housing on two orthogonal sides can distribute over all the layers at the entrance manifolds, pass through the liquid extraction module and be collected in the exit manifolds. Seals may be formed along the corners between the liquid extraction module and the housing, to prevent the two fluids from bypassing and directly contacting one another. The seals can be, for example, an injected foam or soft rubber. Thus, the two fluids will contact one another only through the pores of the porous membrane.

In many embodiments, the feed solution and extractant flow paths are uniform across the liquid extraction module cross-section. In some embodiments, the housing is rigid, and the module is fitted within the housing such that there is minimal expansion of the module, as fluid pressure is applied to it. Two different pressures can be maintained for each fluid. For membrane extraction with immiscible liquids, a higher pressure is maintained on the fluid that does not wet the porous membrane.

With an extraction module designed as described above, very large porous membrane surface areas are possible at a minimum cost, enabling maximum mass transfer of a solute between the feed and the extraction phases. These extraction modules are also convenient to load and un-load from a housing. Production capacity in a process can be adjusted by adding or subtracting modules.

The structure of the extraction module lends itself to automated assembly. Layers can be assembled by a variety of techniques, described below. In many embodiments, during assembly the delicate porous membrane is only manipulated when it is stacked and edge-sealed, thus reducing possible damage to the porous membranes within the extraction module.

A partial listing of exemplary fluids that can be used with this extraction module include solvents such as decyl alcohol, 2,6-dimethyl-4-heptanol, dodecane, or mixtures thereof, and aqueous fluids such as ethanol/water, aqueous amine or fermentation broth. In one embodiment, the extraction membrane transfers ethanol preferentially from an aqueous phase to a solvent phase.

One embodiment of a cross-flow membrane module is shown in FIG. 1. This cross-flow membrane module or liquid-liquid extraction element 100 includes a first layer pair 110 and a second layer pair 120. The second layer pair 120 is disposed adjacent the first layer pair 110 forming a stack of layers 150. The stack of layers 150 has an x-, y-, and z-axis as shown in FIG. 1. The z-axis is the thickness direction of the stack of layers 150. The x-axis and y-axis are both in-plane axes of the stack of layers 150 and are orthogonal to one another.

The first layer pair 110 includes first polymeric microporous membrane 112 and a first flow channel layer 114 oriented in a first flow $F_1$ direction (along the x-axis of FIG. 1) having a fluid inlet 116 and a fluid outlet 118 disposed on first opposing sides of the extraction element 100 (along the y-axis of FIG. 1). Thus, in the illustrative embodiment shown in FIG. 1, the first flow $F_1$ direction is orthogonal to the first opposing sides of the liquid-liquid extraction element 100.

The second layer pair 120 includes a second polymeric microporous membrane 122 and a second flow channel layer 124 oriented in a second flow direction $F_2$ (along the y-axis of FIG. 1) different than the first flow direction $F_1$ and having a fluid inlet 126 and a fluid outlet 128 disposed on second opposing sides (along the x-axis of FIG. 1) of the extraction element 100. Thus, in the illustrative embodiment shown in FIG. 1, the second flow $F_2$ direction is orthogonal to the second opposing sides of the liquid-liquid extraction element 100. The first microporous membrane 112 is shown disposed between the first flow channel layer 114 and the second flow channel layer 124. In one embodiment, the first flow direction $F_1$ is orthogonal to the second flow direction $F_2$, but this is not required.

In many embodiments, the liquid-liquid extraction element 100 includes a plurality (two or more) of alternating first layer pairs 110 and second layer pairs 120. In some embodiments, the liquid-liquid extraction element 100 includes from 10 to 2000, or 25 to 1000, or 50 to 500 alternating first layer pairs 110 and second layer pairs 120 stacked in vertical registration (along the z-axis) where the first flow direction $F_1$ (along the x-axis) is orthogonal to the second flow direction $F_2$ (along the y-axis).

The flow channel layers 114, 124 and the microporous membrane layers 112, 122 have layer thicknesses (along the z-axis) of any useful value. In many embodiments, the first flow channel layer 114 and the second flow channel layer 124 each has a thickness in a range from 10 to 250, or 25 to 150 micrometers. In many embodiments, the first polymeric microporous membrane 112 and the second polymeric microporous membrane 122 each has a thickness in a range from 1 to 200, or 10 to 100 micrometers. The liquid-liquid extraction element 100 has an overall thickness (along the z-axis) of any useful value. In some embodiments, the liquid-liquid extraction element 100 has an overall thickness (along the z-axis) in a range from 5 to 100, or 10 to 50 centimeters.

The liquid-liquid extraction element 100 can have any useful shape. In many embodiments, the liquid-liquid extraction element 100 has a rectilinear shape. The liquid-liquid extraction element 100 has a width (along the y-axis) and a length (along the x-axis) of any useful value. In some embodiments, the liquid-liquid extraction element 100 has an overall width (along the y-axis) in a range from 10 to 300, or 50 to 250 centimeters. In some embodiments, the liquid-liquid extraction element 100 has an overall width (along the x-axis) in a range from 10 to 300, or 50 to 250 centimeters. In one embodiment, the liquid-liquid extraction element 100 length is equal or substantially equal to its width.

The first and second flow channel layers 114, 124 can be formed of the same or different material and take the same or different forms, as desired. The first and second flow channel layers 114, 124 can allow liquid to flow between first and second microporous membranes 112, 122. In many embodiments, the first and second flow channel layers 114, 124 can be structured such that the first and second flow channel layers 114, 124 form flow channels between the microporous membranes 112, 122. In some embodiments, the first and second flow channel layers 114, 124 are non-porous and formed of a polymeric material such as, for example, a polyolefin.

In some embodiments, the first and second flow channel layers 114, 124 are corrugated (having parallel alternating peaks and valleys) to provide flow channels between the microporous membranes 112, 122. In many embodiments, the corrugations provide flow channels that are parallel the flow direction. These corrugations can have any useful pitch (distance between adjacent peaks or valleys). In some embodiments, the corrugations have a pitch in a range from 0.05 to 1, or from 0.1 to 0.7 centimeter. The corrugations can be formed by any useful method such as, for example, embossing, molding, and the like.

As shown in FIG. 1, an exemplary configuration of the liquid-liquid extraction element 100 includes a first layer pair 110 having first planar polymeric microporous membrane 112 and a first corrugated flow channel layer 114 oriented in a first flow $F_1$ direction (along the x-axis of FIG. 1). Thus, in the illustrative embodiment shown in FIG. 1, the first flow $F_1$ direction is parallel to the corrugations of the first corrugated flow channel layer 114. The second layer pair 120 includes a second planar polymeric microporous membrane 122 and a second corrugated flow channel layer 124 oriented in a second flow direction $F_2$ (along the y-axis of FIG. 1) orthogonal to the first flow direction $F_1$ and parallel to the corrugations of the second corrugated flow channel layer 124. Thus, in the illustrative embodiment shown, the first flow direction $F_1$ is orthogonal to the second flow direction $F_2$, and the corrugations of the first corrugated flow channel layer 114 are orthogonal to the corrugations of the second corrugated flow channel layer 124.

The liquid-liquid extraction element 100 can optionally include layer seals 130, 140 disposed along the selected edges of the liquid-liquid extraction element 100. First layer seals 130 can be formed between the porous membrane of one layer, and the flow channel layer below it (in the flow direction of that flow channel layer) along opposing sides of the liquid-liquid extraction element 100. Second layer seals 140 can be formed between the porous membrane of one layer, and the flow channel layer below it (in the flow direction of that flow channel layer) along opposing sides of the liquid-liquid extraction element 100. In many embodiments, first and second layer seals, 130, 140 alternate on opposing sides, as shown in FIG. 1.

In some embodiments, layer seals 130, 140 between the layers can be beads of adhesive, or a sonic seal, or a heat seal. Thus, a two-directional liquid-liquid extraction flow module 100 can be created, in which a first fluid flows through the module in a first direction, passing through the corrugated spacers and porous membrane of every other layer, contacting the porous membrane layers uniformly on one side; and a second fluid is directed to flow through the liquid extraction module in a second direction (often orthoganol) to the first direction, passing through the corrugated spacers of layers alternate to the first, contacting the membrane layers uniformly on the other side.

In some embodiments, a first porous non-woven layer (not shown) is disposed between the first polymeric microporous membrane 112 and the first flow channel layer 114 and a second porous non-woven layer (not shown) is disposed between the second polymeric microporous membrane 122 and the second flow channel layer 124. This porous non-woven layer can assist in reinforcing the microporous membrane layer and/or the flow channel layer. The porous non-woven layer can be any useful material such as, for example, a spun bond layer. This porous non-woven layer can be optionally attached (adhesive, ultrasonic seal, heat seal, and the like) to the polymeric microporous membrane and/or flow channel layer.

The material used for the microporous membrane can assume a wide variety of forms. Microporous membrane materials typically have micrometer or sub-micrometer sized pores (i.e., micropores) that extend between major surfaces of the membrane. The micropores may be, for example, isolated or interconnected. The microporous membrane material may be formed from any material having micropores therethrough, for example, a microporous thermoplastic polymer. The microporous membrane material can be flexible or rigid.

When utilized as a liquid extraction membrane, micropore size, thickness, and composition of the microporous membrane can determine the rate of extraction. The size of the micropores of the microporous membrane should be sufficiently large to permit contact between the feed solution and the liquid extractant within the micropores, but not so large that flooding of the feed solution through the microporous membrane into the extractant occurs.

Useful microporous membrane materials include, for example, hydrophilic or hydrophobic materials. Microporous membranes can be prepared by methods described in, for example, U.S. Pat. No. 3,801,404 (Druin et al.); U.S. Pat. No.

3,839,516 (Williams et al.); U.S. Pat. No. 3,843,761 (Bierenbaum et al.); U.S. Pat. No. 4,255,376 (Soehngen et al.); U.S. Pat. No. 4,257,997 (Soehngen et al.); U.S. Pat. No. 4,276,179 (Soehngen); U.S. Pat. No. 4,973,434 (Sirkar et al.), and/or are widely commercially available from suppliers such as, for example, Celgard, Inc. (Charlotte, N.C.), Tetratec, Inc. (Ivyland, Pa.), Nadir Filtration GmbH (Wiesbaden, Germany), or Membrana, GmbH (Wuppertal, Germany). Exemplary hydrophilic membranes include membranes of porous polyamide (e.g., porous nylon), porous polycarbonate, porous ethylene vinyl alcohol copolymer, and porous hydrophilic polypropylene. Exemplary hydrophobic membranes include membranes of porous polyethylene, porous polypropylene (e.g., thermally induced phase separation porous polypropylene), and porous polytetrafluoroethylene.

The mean pore size of useful microporous membrane materials (e.g., as measured according to ASTM E1294-89 (1999) "Standard Test Method for Pore Size Characteristics of Membrane Filters Using Automated Liquid Porosimeter") may be greater than about 0.07 micrometer (e.g., greater than about 0.1 micrometer or greater than about 0.25 micrometer), and may be less than about 1.4 micrometers (e.g., less than about 0.4 micrometer or less than about 0.3 micrometer), although microporous membranes having larger or smaller mean pore sizes may also be used. In order to reduce emulsion formation and/or flooding across the membrane, the microporous membrane may be substantially free of pores, tears, or other holes that exceed about 100 micrometers in diameter.

In many embodiments, microporous membrane materials have a porosity in a range of from at least about 20 percent (e.g., at least about 30 percent or at least about 40 percent) up to about 80 percent, about 87 percent, or even about 95 percent, based on the volume of the microporous membrane material.

Although microporous membrane materials of any thickness may be used, as described above, in many embodiments, microporous membranes have a thickness of at least about 10 micrometer (e.g., at least about 25 micrometers or at least 35 micrometers or at least about 40 micrometers), and/or have a thickness of less than about 120 micrometers (e.g., less than about 80 micrometers or even less than about 60 micrometers). The microporous membrane can be mechanically strong enough, alone or in combination with an optional porous support member, to withstand any pressure difference that may be imposed across the microporous membrane under the intended operating conditions.

In many embodiments, the microporous membrane includes at least one hydrophobic (i.e., not spontaneously wet out by water) material. Exemplary hydrophobic materials include polyolefins (e.g., polypropylene, polyethylene, polybutylene, copolymers of any of the forgoing and, optionally, an ethylenically unsaturated monomer), and combinations thereof. If the microporous membrane material is hydrophobic, a positive pressure may be applied to the contained feed solution relative to the liquid extractant to aid in wetting the microporous membrane.

In some embodiments, the microporous membrane is hydrophilic, for example, a hydrophilic porous polypropylene membrane material having a nominal average pore size in a range of from 0.2 to 0.45 micrometers (e.g., as marketed under the trade designation "GH POLYPRO MEMBRANE" by Pall Life Sciences, Inc., Ann Arbor, Mich.). If the microporous membrane material is hydrophilic, positive pressure may be applied to the contained liquid extractant relative to the contained feed solution to facilitate immobilization of the liquid-liquid interface within the microporous membrane. In some embodiments, useful microporous membranes include microporous membranes as described in U.S. Pat. No. 3,801,404 (Druin et al.); U.S. Pat. No. 3,839,516 (Williams et al.); U.S. Pat. No. 3,843,761 (Bierenbaum et al.); U.S. Pat. No. 4,255,376 (Soehngen); U.S. Pat. No. 4,257,997 (Soehngen et al.); and U.S. Pat. No. 4,276,179 (Soehngen); U.S. Pat. No. 4,726,989 (Mrozinski); U.S. Pat. No. 5,120,594 (Mrozinski); and U.S. Pat. No. 5,238,623 (Mrozinski), the disclosures of which are incorporated herein by reference.

Figure 2:
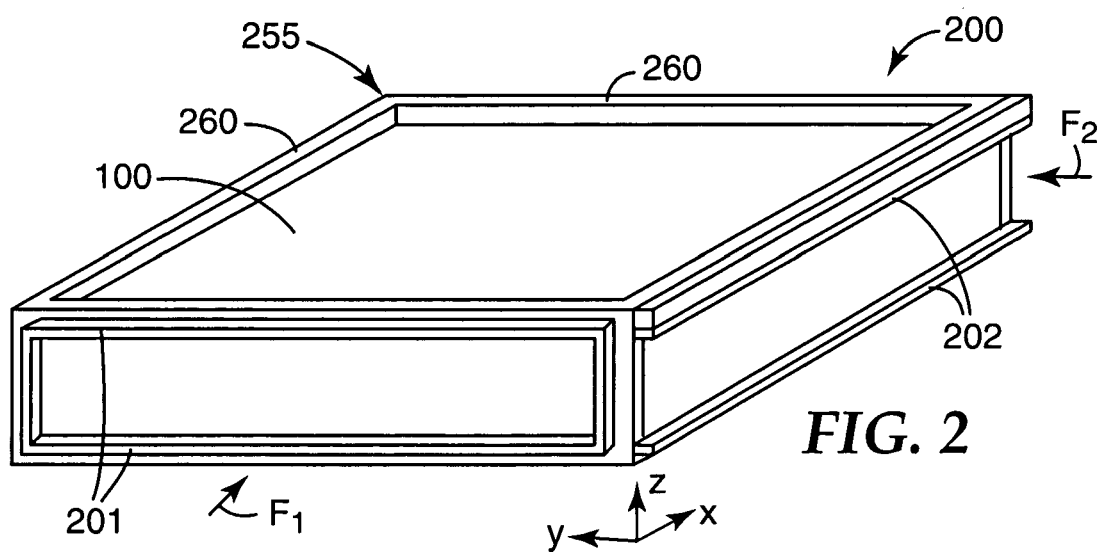
FIG. 2 is a schematic perspective view of an illustrative cross-flow membrane module disposed within a frame.

FIG. 2 is a schematic perspective view of an illustrative cross-flow membrane module 100 disposed within a frame 255. The cross-flow membrane module 100 is described above. In many embodiments, the frame 255 provides improved handling and protection of the liquid-liquid extraction module 100, while still allowing unimpeded liquid flow through the sides of the liquid-liquid extraction module 100. In some embodiments, the frame 255 cooperates with a housing module (described below) to form a "lock and key" fit type of construction to isolate the liquid-liquid extraction phases ($F_1$ and $F_2$) from one another during operation of the cross-flow membrane module 100.

The frame 255 includes a plurality of frame members 260 disposed about the liquid-liquid extraction module 100. As shown in FIG. 2, the plurality of frame members 260 can be disposed along the eight side edges of the liquid-liquid extraction module 100 and are attached to each other to form a unitary frame 255 element about the liquid-liquid extraction module 100. In many embodiments, first side seals 201 are disposed on first opposing sides of the frame 255 that correspond to the first flow direction $F_1$ and assist in isolating the first flow direction $F_1$ fluid flow. In many embodiments, second side seals 202 are disposed on second opposing sides of the frame 255 that correspond to the second flow direction $F_2$ and assist in isolating the second flow direction $F_2$ fluid flow.

The first side seals 201 can be formed of any useful material such as a rigid or conformable or a combination of rigid and conformable material. In one embodiment, the first side seal 201 is a neoprene ridge of material having a height and width in a range from 0.5 to 1.5 cm. In another embodiment, the first side seal 201 is a rigid plastic (e.g., ABS) ridge of material having a height and width in a range from 0.5 to 1.5 cm. In a further embodiment, the first side seal 201 is plastic ridge having an outer layer formed of a conformable material (e.g., neoprene) having a total height and width in a range from 0.5 to 1.5 cm.

The second side seals 202 can be formed of any useful material such as a rigid or conformable or a combination of rigid and conformable material. In one embodiment, the second side seal 202 is a neoprene ridge of material having a height and width in a range from 0.5 to 1.5 cm. In another embodiment, the second side seal 202 is a rigid plastic (e.g., ABS) ridge of material having a height and width in a range from 0.5 to 1.5 cm. In a further embodiment, the second side seal 202 is plastic ridge having an outer layer formed of a conformable material (e.g., neoprene) having a total height and width in a range from 0.5 to 1.5 cm. In some embodiments, the second side seal 202 can also function as a guide rail or track to assist the placement and removal and/or alignment of the module 100 within the module housing (described below).

The frame 255 can be formed of any useful material. In some embodiments, the frame 255 is formed of a rigid polymeric material such as, for example, ABS. The each frame member 260 can independently have any useful dimension. In some embodiments, each frame member 260 has a thickness in a range from 1 to 15 centimeters and width in a range from 1 to 15 centimeters and a length sufficient to extend along the corresponding adjacent side edge of the liquid-liquid extraction module 100.

Figure 3A:
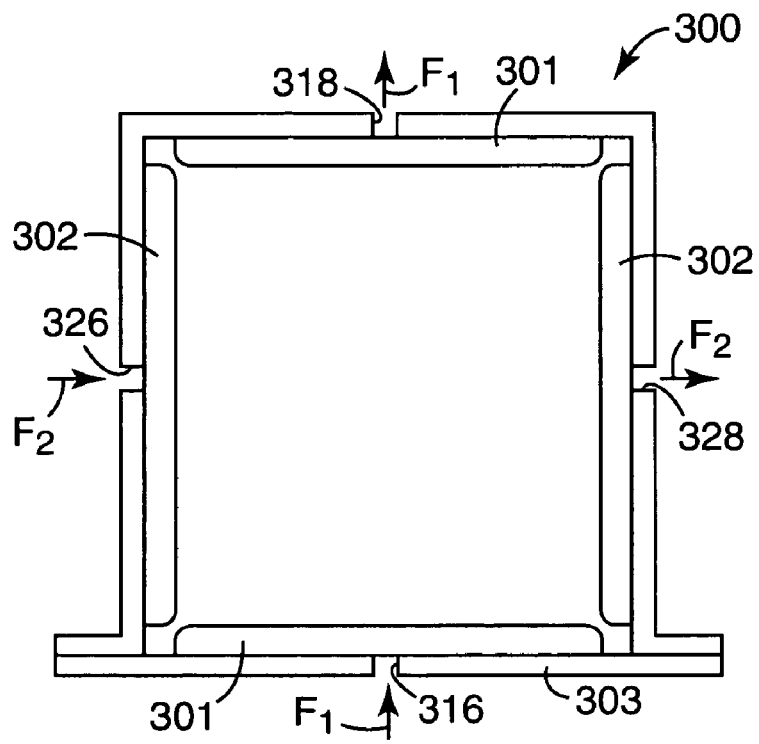
FIG. 3A is a schematic cross-sectional view of an illustrative cross-flow membrane module housing.

FIG. 3A is a schematic cross-sectional view of an illustrative cross-flow membrane module housing 300. The module housing 300 is sized and configured to allow the cross-flow membrane module 100 to fit within the module housing 300. The module housing 300 can be formed of any useful material, such as a polymeric or metallic material. In many embodiments, the module housing 300 has a removable portion or door 301 to allow the liquid-liquid extraction module 100 to be removed from within the module housing 300. The module housing 300 includes a first liquid flow inlet 316 in fluid connection with a first liquid flow outlet 318. The module housing 300 includes a second liquid flow inlet 326 in fluid connection with a second liquid flow outlet 328. In many embodiments, the module housing 300 includes a removable portion 303 that allows the liquid-liquid extraction module 100 to be inserted, removed and/or replaced within the module housing 300.

In many embodiments, first side seals 301 are disposed on first opposing sides of the module housing 300 that correspond to the first flow direction $F_1$ and assist in isolating the first flow direction $F_1$ fluid flow. In many embodiments, second side seals 302 are disposed on second opposing sides of the module housing 300 that correspond to the second flow direction $F_2$ and assist in isolating the second flow direction $F_2$ fluid flow.

The first side seals 301 can be formed of any useful material such as a rigid or conformable or a combination of rigid and conformable material. In one embodiment, the first side seal 301 is a neoprene ridge of material having a height and width in a range from 0.5 to 1.5 cm. In another embodiment, the first side seal 301 is a rigid plastic (e.g., ABS) ridge of material having a height and width in a range from 0.5 to 1.5 cm. In a further embodiment, the first side seal 301 is plastic ridge having an outer layer formed of a conformable material (e.g., neoprene) having a total height and width in a range from 0.5 to 1.5 cm. First side seals 301 can be sized and configured to mate (e.g., a lock and key fit) with the first side seals 201 of the membrane module 200.

The second side seals 302 can be formed of any useful material such as a rigid or conformable or a combination of rigid and conformable material. In one embodiment, the second side seal 302 is a neoprene ridge of material having a height and width in a range from 0.5 to 1.5 cm. In another embodiment, the second side seal 302 is a rigid plastic (e.g., ABS) ridge of material having a height and width in a range from 0.5 to 1.5 cm. In a further embodiment, the second side seal 302 is plastic ridge having an outer layer formed of a conformable material (e.g., neoprene) having a total height and width in a range from 0.5 to 1.5 cm. In some embodiments, the second side seal 302 can also function as a guide rail or track to assist the placement and removal and/or alignment of the module 100 within the module housing (described below). Second side seals 302 can be sized and configured to mate with the second side seals 202 of the membrane module 200.

Figure 3B:
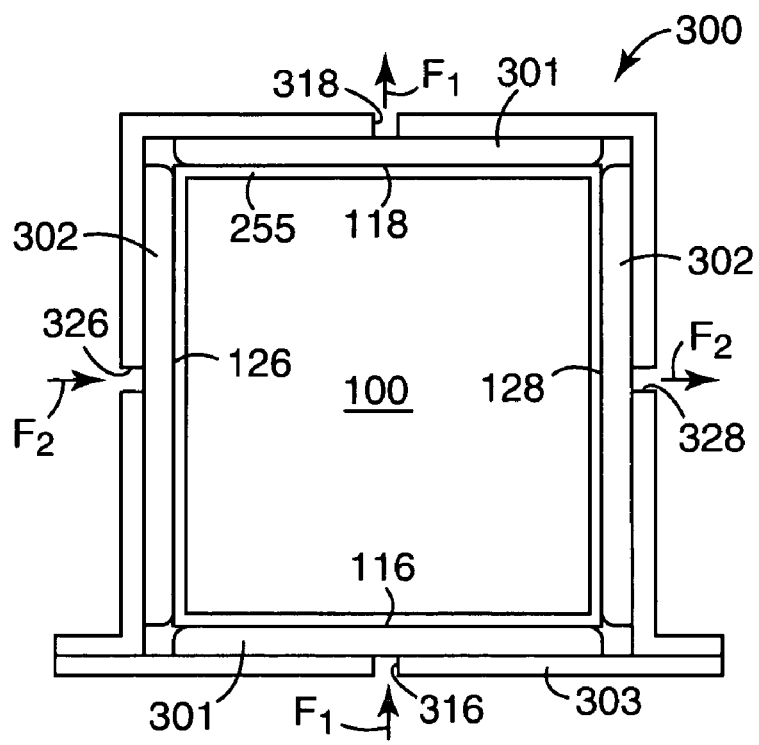
FIG. 3B is a schematic cross-sectional view of an illustrative cross-flow membrane module disposed within a module housing.

FIG. 3B is a schematic cross-sectional view of an illustrative cross-flow membrane module 100 disposed within a module housing 300. When the liquid-liquid extraction module 100 is disposed within the module housing 300, the first liquid flow inlet 316 is in fluid connection with the first flow channel layer inlet 116 which is in fluid communication with the first flow channel layer outlet 118 which is in fluid communication with the first liquid flow outlet 318. When the liquid-liquid extraction module 100 is disposed within the module housing 300, the second liquid flow inlet 326 is in fluid connection with the second flow channel layer inlet 126 which is in fluid communication with the second flow channel layer outlet 128 which is in fluid communication with the second liquid flow outlet 328. In many embodiments, the membrane module 200 includes a frame 255 which mates with the interior of the module housing 300, as described above.

In use, a liquid-liquid extraction module 100 described above, can be loaded into a module housing 300 and utilized in extracting a dissolved solute from a first liquid to a second liquid by flowing a first liquid having a dissolved solute through the first flow channel layer, flowing a second liquid through the second flow channel layer, and transferring the solute from the first liquid into the second liquid across the first and second microporous membranes. The liquid-liquid extraction module 100 can be replaced with another liquid-liquid extraction module 100 by removing the removable portion 303 from the outer housing 300, replacing the liquid-liquid extraction module 100 with a second liquid-liquid extraction module 100, and replacing the removable portion 303 on the outer housing 300.

Figure 4:
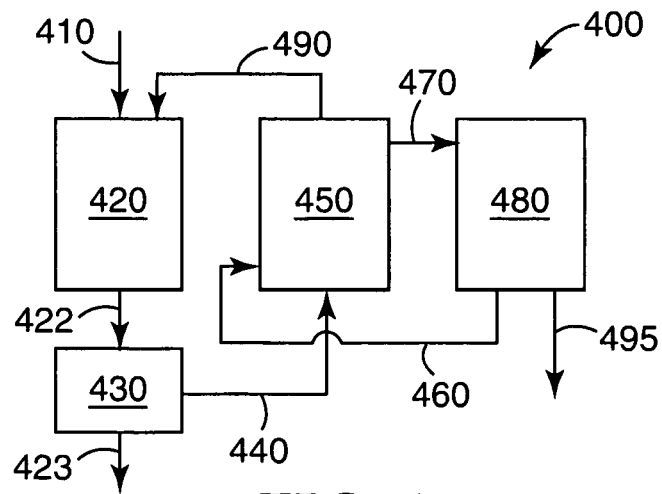
FIG. 4 is a schematic flow diagram of an illustrative liquid-liquid extraction process.

FIG. 4 is a schematic flow diagram of an illustrative liquid-liquid extraction process 400. An illustrative ethanol extraction from a fermentation broth is described below, however, the liquid-liquid extraction module described herein is applicable to any liquid-liquid extraction process.

Feed stock 410 (e.g., water, microorganisms, and fermentable material) is placed into a fermenter 420 and allowed to form a fermentation broth 422. The fermentation broth 422 can contain, for example, water and a solute such as ethanol. Insoluble material 423 in the fermentation broth can be optionally removed (e.g., by sedimentation and/or filtration) with a purifying unit 430 and the resultant feed solution 440 is transported to the liquid-liquid extraction module 450. In the liquid-liquid extraction module 450, feed solution 440 and extractant (or solvent) 460 are brought into intimate contact with each other such that ethanol partitions between feed solution 440 and extractant 460. Suitable solvents or extractants 470 for this particular embodiment are disclosed in US 2004/0181101, and is incorporated by reference herein to the extent it does not conflict with the present disclosure. Extract 470, which contains extractant 460 and ethanol, is then transported to recovery unit 480 where ethanol 495, optionally mixed with water, is removed from extract 470 (e.g., by vacuum distillation) such that extractant 460 is regenerated and recycled into the liquid-liquid extraction module 450. Likewise, extracted feed solution 490 is returned to fermenter 420, which is periodically replenished with additional feedstock 410 as necessary to replace components that have been removed during the process.

Feed solutions 440 for this illustrative embodiment can include water and ethanol, and may be in the form of a solution, suspension, dispersion, or the like. In addition to ethanol and water, the feed solution may, optionally, contain soluble or insoluble components (e.g., fermentable sugars, saccharides, or polysaccharides, microorganisms, biomass). Examples of suitable biomass for the fermentation process include sugar-based materials (e.g., molasses, sugar cane, and sugar beets); and starch based materials (e.g., corn, wheat, cassava, barley, rye, and oats). Cellulosic biomass containing primarily cellulose, hemicellulose, and lignin plus varying amounts of other materials may be used as well. Similarly, the fermenting microorganism employed in connection with the illustrative embodiment can be any known microorganism used in fermentation processes, including various species of alcohol producing fungi known as yeast, thermophilic bacteria, and various strains of Zymomonas bacteria.

For purposes of this illustrative embodiment, useful fermentation broths can contain ethanol in an amount of from at least 0.5 percent by weight, 2 percent by weight, or 4 percent by weight up to at least 10 percent by weight based on the total weight of the fermentation broth, although higher and lower concentrations of ethanol may also be used.

Processes for preparing fermentation broths are well known. Fermentation broths can be prepared by combining water, a fermentable sugar (or precursor thereof), and a microorganism such as, for example, brewer's yeast in a vessel (e.g., fermenter, vat), and maintaining the mixture at a temperature at which fermentation can occur (e.g., in a range of from about 15 degrees centigrade to about 45 degrees centigrade). Fermenters are widely commercially available and are described in, for example, U.S. Pat. No. 4,298,693.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

Example 1

Preparation of a Membrane Stack with Hot Melt Adhesive Sealed Layers

A polypropylene film having a nominal thickness of 0.076 millimeters (0.003 inches) was embossed into a corrugated film having 1.27 millimeter (0.05 inch) deep channels with a channel spacing of 3.56 millimeters (0.14 inches). A web of spun bond polypropylene (16.96 grams per square meter (0.5 ounces per square yard)), available from Hanes Companies, Inc., Conover, N.C.) was sonically sealed to the ridges of one side of the corrugated film at intervals of 1.59 millimeters (0.063 inches). The spun bond side of this sonically sealed pair was laminated to a microporous polypropylene membrane having an average pore size of approximately 0.35 micrometers (prepared as described in U.S. Pat. Nos. 4,726,989 and 5,120,594) using a hot melt web adhesive (PE-85-20, manufactured by Bostik, Inc., Wauwatosa, Wis.) to form a layer pair. Square 0.686-meter by 0.686-meter (27-inch by-27 inch) sheets of this layer pair were cut with a knife. A single bead of hot melt adhesive (Polybutene-1 DP 8910 PC, available from Basell North America, Inc., Elkton, Md.) was applied along each of two opposing edges of the corrugated layer of a first layer pair, approximately 38 millimeters (1.5 inches) from each edge, in the direction of the channels of the corrugated film. A second square 0.686-meter by 0.686-meter (27-inch by-27 inch) sheet of the layer pair was oriented such that the channels in the corrugated film were orthogonal to those of the first layer pair and the second sheet of the layer pair was pressed onto the first sheet of the layer pair to form a two-layer pair stack. The process was repeated with additional hot melt adhesive and additional sheets of layer pair, with the channels in the corrugated film of the additional sheets of layer pair being orthogonal to those of the preceding sheet of layer pair, until the stack was approximately 149.4 millimeters (5.88 inches) thick.

Each part of a frame that was machined from acrylonitrile-butadiene-styrene (ABS) resin was fitted around the stack and was adhered to each edge of the stack using SILASTIC 732 RTV Adhesive/Sealant (available from Dow Coming Corp., Midland, Mich.) along each edge of the stack. The frame had two opposite sides and, adjacent each side, two opposite ends. The two opposite sides of the frame were machined to have a protruding guide to fit a corresponding track in each side of a housing. The two opposite ends of the frame were machined to have a continuous protruding flange to fit a rubber seal between each end of the frame and each end of a housing.

Example 2

Preparation of a Membrane Stack with Heat Sealed Layers

One 222.3-millimeter by 222.3-millimeter (8.75-inch by 8.75 inch) sheet of a microporous polypropylene membrane having an average pore size of approximately 0.35 micrometers (prepared as described in U.S. Pat. Nos. 4,726,989 and 5,120,594) was placed on top of another sheet of the membrane having the same dimensions, and the two sheets were heat sealed together, forming side seals, using a Model MP-16 Midwest Pacific heat sealer, available from Grainger, Inc., St. Paul, Minn., within about 25 millimeters (1 inch) of both of two opposite edges. This process was repeated with thirteen additional pairs of sheets of the membrane, to provide fourteen pairs of membranes. One pair of membranes was placed on top of another pair such that the sealed edges were aligned, and then each unsealed edge of the bottom sheet of the top pair was heat sealed to the unsealed edge of the top sheet of the bottom pair. This process was repeated with the remaining twelve pairs of sheets to provide a stack of fourteen pairs (twenty eight sheets) in which there were alternating (i.e., orthogonal) continuous flow channels between successive sheets in the stack. Each corner of the stack was cut to form a 25-millimeter (one-inch) square notch to provide a fit in a polycarbonate housing as described below.

Polyethylene film having a nominal thickness of 0.075 millimeters (0.003 inches) was embossed into a corrugated film having 1.27 millimeter (0.05 inch) deep channels with a channel spacing of 3.56 millimeters (0.14 inches). The embossed film was cut into strips having dimensions of 222.3 millimeters (8.75 inches) by approximately 165 millimeters (6.5 inches), and these strips were inserted into the continuous flow channels between the sheets in the stack, with the channels in the embossed film being parallel to the side seals. Each corner of this stack was sealed with two-part epoxy adhesive (DP-100, available from 3M Company, St. Paul, Minn.) by injecting the adhesive between each of the layers, including the corrugated polyethylene layers.

The microporous membrane and corrugated polyethylene stack was sealed into one part of a rectangular polycarbonate housing by placing the two-part epoxy adhesive in the corners of the housing, placing the stack in the housing, and then allowing the epoxy adhesive to cure in each of the four corners. These corners were further sealed by applying SILASTIC 732 RTV Adhesive/Sealant (available from Dow Coming Corp., Midland, Mich.) along each edge of the cured epoxy adhesive in the housing. A neoprene gasket was used to seal a second part of the rectangular polycarbonate housing with the first part, the two parts being held together with bolts, to form a cross-flow membrane module. Each side of the housing had a threaded port having a diameter of approximately 12.7 millimeters (0.5 inches) and a valve was fitted into each port, the valves on opposite sides being connected via the continuous flow channels between the sheets in the stack.

A 10-weight percent aqueous ethanol solution was pumped through the valve on one side of the module (an inlet valve)

and was directed through the module and through the valve on the opposite side (an outlet valve). Decyl alcohol (available from Sigma-Aldrich Corp., St. Louis, Mo.) was pumped through the valve (an inlet valve) on a side adjacent the side bearing the valvethrough which the ethanol solution was pumped. The decyl alcohol was directed through the module and through the valve (an outlet valve) on the opposite side. A pressure of approximately 40 centimeters of water was maintained in the aqueous ethanol channel, whereas a pressure of approximately 30 centimeters of water was maintained in the decyl alcohol channel, the pressure being controlled using the outlet valves. After approximately five minutes, analysis of the decyl alcohol by gas chromatography indicated that the decyl alcohol contained ethanol.

The present invention has been described with reference to several embodiments thereof. The foregoing detailed description and examples have been provided for clarity of understanding only, and no unnecessary limitations are to be understood therefrom. It will be apparent to those skilled in the art that many changes can be made to the described embodiments without departing from the spirit and scope of the invention. Thus, the scope of the invention should not be limited to the exact details of the compositions and structures described herein, but rather by the language of the claims that follow. The complete disclosures of the patents, patent documents and publications cited herein are incorporated by reference in their entirety as if each were individually incorporated. In case of any conflict, the present specification, including definitions, shall control.

What is claimed is:

1. A liquid-liquid extraction system comprising:
   a feed solution vessel containing a volume of a feed solution, the feed solution comprising a first liquid having a dissolved solute;
   a solvent vessel containing a volume of a solvent;
   a liquid-liquid extraction element comprising:
      a plurality of first layer pairs in fluid communication with the feed solution vessel, each first layer pair comprising:
         a first polymeric microporous membrane; and
         a first flow channel layer oriented in a first flow direction having a first fluid inlet and a first fluid outlet disposed on first opposing sides of the extraction element;
      a plurality of second layer pairs in fluid communication with the solvent vessel, with at least one second layer pair being disposed between two first layer pairs and at least one first layer pair being disposed between two second layer pairs so as to form a stack of layers, each second layer pair comprising:
         a second polymeric microporous membrane; and
         a second flow channel layer oriented in a second flow direction different than the first flow direction and having a second fluid inlet and a second fluid outlet disposed on second opposing sides of the extraction element;
      a first entrance manifold in fluid communication with the first fluid inlet of each first layer pair and through which the feed solution enters all of the first layer pairs;
      a first exit manifold in fluid communication with the first fluid outlet of each first layer pair and through which at least the first liquid exits from all of the first layer pairs;
      a second entrance manifold in fluid communication with the second fluid inlet of each second layer pair and through which the solvent enters all of the second layer pairs; and
      a second exit manifold in fluid communication with the second fluid outlet of each second layer pair and through which at least the solvent exits from all of the second layer pairs,
      wherein at least one microporous membrane is disposed between the first flow channel layer and the second flow channel layer of each adjacent first layer pair and second layer pair, and the solute from the feed solution can transfer into the solvent across at least the first and second microporous membranes, and
   further comprising an outer housing, with the outer housing comprising the first entrance manifold, the first exit manifold, the second entrance manifold and the second exit manifold, wherein the first entrance manifold has one first liquid inlet, the first exit manifold has one first liquid outlet, the second entrance manifold has one second liquid inlet, the second exit manifold has one second liquid outlet, and the outer housing has a removable portion to allow the liquid-liquid extraction element to be removed from the outer housing;
   and further comprising a frame disposed about the stack of layers, with the frame being configured to be removably placed within the outer housing.

2. A liquid-liquid extraction system according to claim 1 wherein the first flow direction is orthogonal to the second flow direction.

3. A liquid-liquid extraction system according to claim 1, wherein the liquid-liquid extraction element can be replaced with another liquid-liquid extraction element within the housing.

* * * * *

UNITED STATES PATENT AND TRADEMARK OFFICE
CERTIFICATE OF CORRECTION

PATENT NO.       : 7,794,593 B2
APPLICATION NO.  : 11/290972
DATED            : September 14, 2010
INVENTOR(S)      : Gary W Schukar It is certified that error appears in the above-identified patent and that said Letters Patent is hereby corrected as shown below:

Column 6, Line 30 – Delete "orthoganol)" and insert -- orthogonal) --, therefor.

Column 12, Line 2 – Delete "Coming" and insert -- Corning --, therefor.

Column 12, Line 56 – Delete "Coming" and insert -- Corning --, therefor.

Signed and Sealed this

Thirtieth Day of November, 2010

David J. Kappos
*Director of the United States Patent and Trademark Office*